Figure 5:
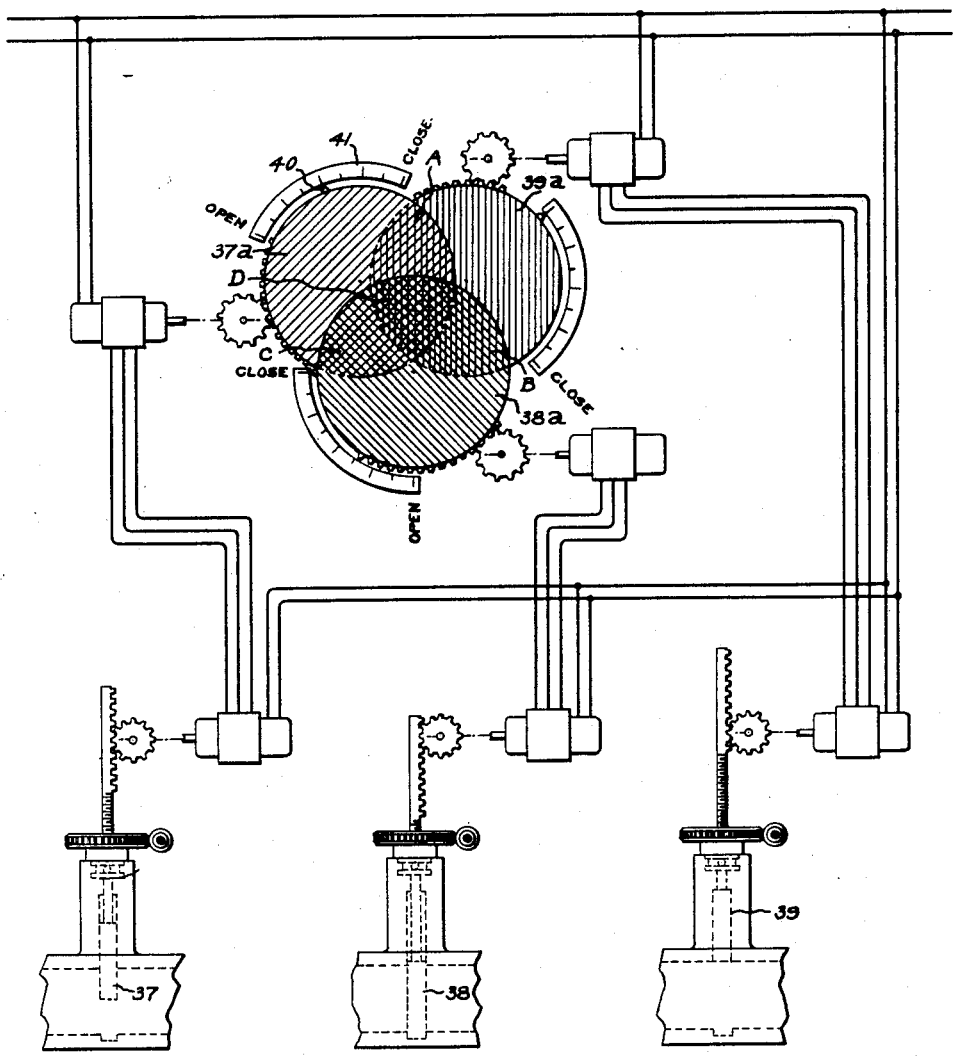

July 12, 1938.   W. H. PRATT   2,123,743
COLOR CHANGING INDICATOR
Filed Sept. 4, 1936   2 Sheets—Sheet 1
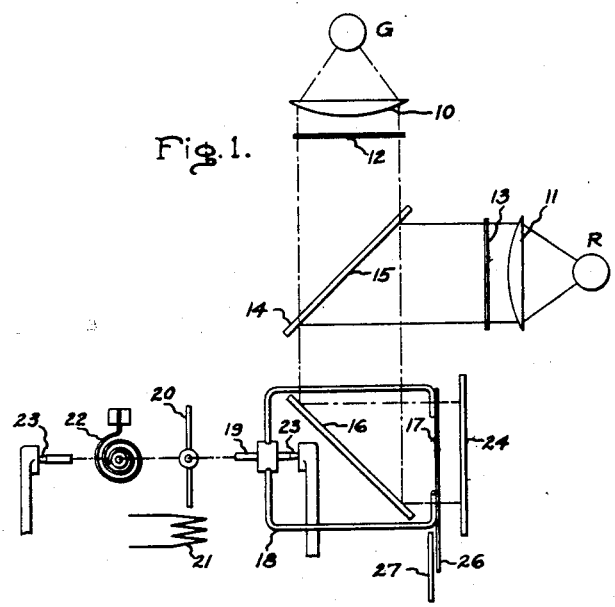
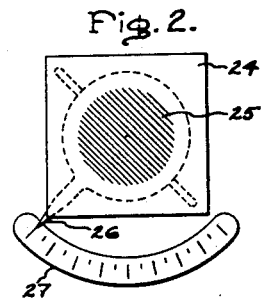
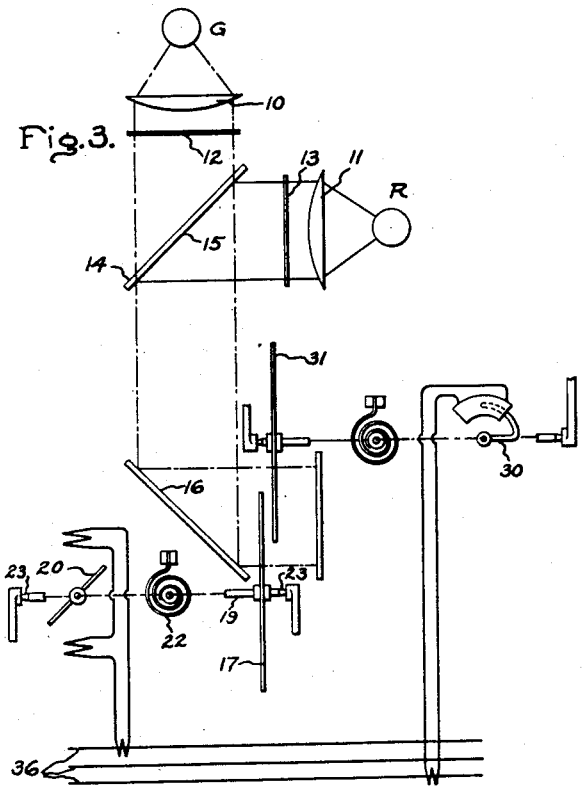
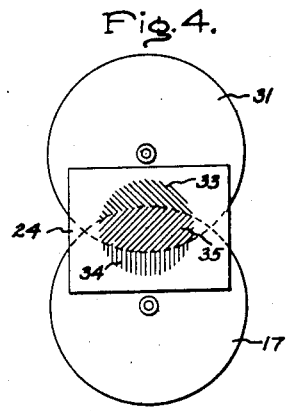
Inventor:
William H. Pratt,
by Harry E. Dunham
His Attorney.

July 12, 1938.  W. H. PRATT  2,123,743
COLOR CHANGING INDICATOR
Filed Sept. 4, 1936   2 Sheets-Sheet 2

Inventor:
William H. Pratt,
by Harry E. Dunham
His Attorney.

Patented July 12, 1938

2,123,743

UNITED STATES PATENT OFFICE 2,123,743

COLOR CHANGING INDICATOR

William H. Pratt, Lynn, Mass., assignor to General Electric Company, a corporation of New York Application September 4, 1936, Serial No. 99,442

8 Claims. (Cl. 116—114)

My invention relates to indicating instruments and one of its objects is to provide an indicator that may be read with approximate accuracy from a considerable distance and in the dark.

Another object of my invention is to provide indicating apparatus which indicates by the change in color or intensity, or both of a light field.

A further object of my invention is to provide a color-changing indicator of a plurality of quantities in which different color indications may be combined to produce a resultant and comparison color indication.

In carrying my invention into effect, I provide different color sources of light, for example, red and green. The different colored light rays from these sources are transmitted to a color-indicating light field through light-polarizing screens. The quantity to be indicated is caused to turn one of the polarizing screens to allow all red or all green or a mixture of such light rays to pass, depending upon the magnitude of such quantity, whereby the color of the light field becomes an indication of such quantity. Two or more such indicating systems may be combined to produce, in addition to color indications of the individual systems, a resultant or comparison color indication.

The features of my invention which are believed to be novel and patentable will be pointed out in the claims appended hereto. For a better understanding of my invention, reference is made in the following description to the accompanying drawings in which Fig. 1 represents a schematic side view of a color-changing indicator for indicating the deflection of an instrument by a change in color; Fig. 2 is a face view of the color-indicating field of the instrument shown in Fig. 1; Fig. 3 is a schematic side view of a color-changing indicator, where the indications of two instruments are obtained as well as a resultant color indication corresponding to the deflection of both instruments. Thus, this scheme may be employed to indicate, for example, two currents, and a comparison indication of their ratio. Fig. 4 is a face view of the color-indicating field of the apparatus of Fig. 3; and Fig. 5 represents my invention applied to give a comparison indication of the extent of gate opening of the three prime movers.

Referring now to Fig. 1, G and R represent sources of green and red light, respectively, such as colored incandescent lamps. Light from these sources is directed through lenses 10 and 11 and light-polarizing screens 12 and 13 to a common mixing screen 14. The screen 14 may be a glass plate which is slightly silvered on the side 15. Light rays (indicated by dotted lines) from the green source will pass through screen 14 and light rays (indicated by full lines) from the red source will be reflected. An equal mixture of polarized green and red light rays will, therefore, be projected downward to a mirror 16 and reflected at right angles to a third light-polarizing screen 17. In the embodiment here shown, the parts above-mentioned with the exception of screen 17 are stationary. Polarizing screen 17 is rotatable in its plane through an angle of ninety degrees in response to the quantity to be indicated. For this purpose, it is supported on a light weight stirrup 18 of such spread as to be able to rotate about the stationary mirror 16. The stirrup 18 is fastened to a shaft 19 of an indicating instrument or shaft which is turned through a suitable angle in response to the quantity whose indication is required. In the present case, shaft 19 is the shaft of an electrical-measuring instrument of the iron vane armature type. The armature is indicated at 20 and the stationary energizing coil at 21. 22 represents a return spring and 23 the pivots. It is assumed that the deflection of this instrument between zero and full-scale deflection is about ninety degrees.

The polarizing screens 12, 13, and 17 may be made of a body of transparent material in which is embedded a large number of minute light-polarizing elements, the polarizing element in each screen being fixed in the same light-polarizing position by being properly oriented in each screen prior to solidification of the supporting material. Polarizing films of this character are described in United States Patent No. 1,956,867 to Land, May 1, 1934. It is known that, where light rays are transmitted through two such polarizing screens in series, all the light rays may be transmitted when the screens are properly oriented with respect to each other and that then, by turning one screen in its plane through an angle of ninety degrees, no light rays will be transmitted. In intermediate relative angular positions of the screens, corresponding proportions of the light rays will be allowed to pass.

The green light rays, which are reflected by mirror 16, are polarized in one plane by screen 12. The red light rays, which are reflected by mirror 16, are polarized in a plane at right angles by the screen 13. Thus, when the rotary analyzer screen 17 is rotated to a position where it allows all of the green rays to pass, it allows none of the red rays to pass and a green colored light will appear on its face or, preferably, on the face of a suitable ground glass plate 24 placed in front of screen 17. This plate 24 may be painted about its edges or otherwise made opaque except for the central viewing field 25 corresponding to the dimensions of the light field of screen 17.

When screen 17 is rotated on its axis ninety degrees from the position just referred to, it allows all of the red rays to pass and none of the green and the circle of light on viewing field 25, Fig. 2, will be red. In most cases, it will be desirable to have the green color appear for zero deflection of the instrument 20—21 and the red color to appear for full-scale deflection of the instrument, although this may be modified as conditions and purpose of the indication warrant. A part-scale deflection will then produce a mixture of red and green light, which will have a brown tinge, and this mixture will vary proportionally from pure green to pure red as the deflection changes from zero to full scale. The color of the light appearing in the viewing field 25 will then give an indication of magnitude of the quantity measured by the instrument and such indication can be seen in the dark and from considerable distances.

If it is desirable to maintain an instrument indication corresponding to say three-quarters full-scale deflection, it may be desirable to paint the border of the light field plate 24 with a color corresponding to that of the light field for such deflection and then it will be easy for the operator to determine, by comparing the difference in color, if any, the relation of the deflection to that which is desired. For example, if the light field is too red, the indication is high and, if it is too green, the indication is low. The instrument may also be provided with a pointer 26 and scale 27, if desired.

It will be evident that, if screens 12 and 13 be rotated in their planes by ninety degrees, the light field will appear red for zero deflection and green for full-scale deflection. It is not essential that the angle of polarization between screens be exactly 90 degrees although this will generally give the best color-changing results. Adjustment corresponding to zero color setting of the color scale may be had by rotating screens 12 and 13 slightly. It is feasible to use a 180 degree instrument deflection and have the color green for zero and full-scale deflection and red for half-scale deflection, or vice versa, without change in the structure. Red and green lights have been specified by way of example. Other colors and shades of light may be used.

In Fig. 3, parts which are similar to those of Fig. 1 are indicated by like reference characters. In Fig. 3, the same light-polarizing system is employed for producing the color indications of two instruments. One instrument 20 operates an analyzer screen 17, as in Fig. 1, and a second instrument 30 rotates a second analyzer screen 31. The analyzer screens 17 and 31 overlap to a certain extent in the path of the light rays and there is a border portion where light strikes screen 17 only and another border portion where light strikes screen 31 only. The light-viewing field for all three conditions will be substantially as represented in Fig. 4 where the upper section 33 is that portion of the light field covered by analyzer screen 31 only, the lower section 34 is that covered by analyzer screen 17 only, and the central portion 35 is that covered by the overlapping portions of both screens 17 and 31. The remainder of the viewing plate may be painted with an opaque paint of suitable color or colors.

It is assumed for the purpose of illustration that the instruments 20 and 30 are ammeters which measure the current flow in the two outside wires of a three-wire feeder system 36 and that it is desirable to obtain a comparison indication of the relative magnitude of these currents. If, now, both instruments have a deflection range of ninety degrees, rotate their analyzer screens in the same direction, and allow pure green light rays to pass in the zero-indicating positions, then, for full-scale deflections, they will allow pure red light rays to pass. The central portion 35 of the indicating field is influenced by both analyzer screens.

For perfect current balance in the system 36, and similar capacity ammeters, the color of all three sections of the viewing plate will be the same. For an unbalanced condition, the three portions 33, 34, and 35 will be of different color. Portion 33 may have a decided green tinge and portion 34 a decided red tinge, indicating that the current of ammeter 20 is greater than that of ammeter 30. In general, the color of portion 35 corresponds to the average of the currents of both instruments and its brightness to their ratio. For example, if ammeter 20 allows only red light to pass and ammeter 30 allows only green light to pass, no light can pass through the overlapping portions of their analyzer screens, the ratio of currents is infinity, and the central portion 35 of the viewing screen is dark. If the ratio of currents in the ammeters is unity, the field 35 will be of maximum brilliancy and of a color depending upon the magnitudes of the currents. For example, if the central portion 35 is a high intensity green, it indicates that both currents are approximately zero; if a low-intensity green with a brownish tinge, it indicates that the sum of the currents is low but badly unbalanced.

In Fig. 5, I have indicated the viewing field of a color-comparing indicator system as arranged to show the extent of opening of three valves and a comparison of their positions. The valves 37, 38, and 39 may represent gates of three water turbines in the same station. Their operating mechanisms are connected to the three analyzer screens 37a, 38a, and 39a through suitable motion-transmitting systems such that an analyzer screen is turned through an angle of ninety degrees as the corresponding gate moves from fully closed to fully open position. It will be assumed that each screen allows green light to pass in the closed position of its gate and allows red light to pass in the open position of its gate. The initial polarizing screens and light sources are not shown but may be similar to that already described in connection with Figs. 1 and 3, and that the light field has an area large enough to cover all three of the screens represented. The analyzer screens have a portion of the light field D where they all overlap, a portion A where screens 37a and 39a overlap, a portion C where screens 37a and 38a overlap, a portion B where screens 38a and 39a overlap, and portions of each screen where there is no overlapping. Gate 37 is shown half open and its analyzer screen 37a will show a brown colored light. Gate 38 is closed and its analyzer screen 38a will show a green colored light. Gate 39 is fully open and its screen 39a will show a red light. Under these conditions, sections D and B of the light field will be dark because screen 38a cuts off all red light and screen 39a all green light. Section A will be brownish red and section C brownish green.

If it is desired to operate with only gates 37 and 39 partly open and balanced, the operator will adjust the gates until there is a uniform coloring of screens 37a and 39a and section A. The coloring of sections C and B will also be balanced, but will have a greater amount of green light mixed with their coloring because analyzer screen 38a will be green. Section D will have a coloring of a shade between sections C and B. If gates 37 and 39 are fully open, sections C, D, and B will show no light and their light intensity for other conditions will be inversely proportional to the extent of gate openings at 37 and 39.

To balance gate opening with all turbines operating, the operator will adjust until the coloring of all sections is as near uniform as possible. If desired, section D may be covered by a suitably colored opaque plate section corresponding in color to maximum efficiency gate opening or some other condition which is desirable to approach when conditions permit. If desired, the analyzers may be provided with pointers 40 and scales 41 for calibration and close-up observation of the gate open condition. Such pointers and scales, however, cannot be seen in the dark or from considerable distances as can the color-changing light indicators.

The combination of color indicators may, of course, be used to indicate any combination of conditions. For example, in Fig. 3, one analyzer might indicate gate opening and the other might indicate the head of water of the same hydroelectric-generating unit so arranged to give a distinctive coloring scheme for a combination of gate opening and water head corresponding to maximum efficiency.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. Indicating apparatus for indicating by a change in color comprising, a pair of light sources of different colors, means for projecting light from said sources onto a translucent screen, means for causing the light projected from the different sources to be polarized in axes displaced about ninety degrees to each other, an analyzer screen interposed between said light-polarizing means and the translucent screen, and means responsive to a condition to be indicated for rotating the analyzer screen from a position where it allows only light of one color to pass to a position where it allows only light of the other color to pass.

2. Indicating apparatus for indicating by a change in color comprising, a pair of light sources of different colors, a translucent screen upon which light from both sources is projected, a light-polarizing system interposed between said light sources and said translucent screen including a rotatively mounted analyzer screen, and means responsive to a condition to be indicated for rotating said analyzer screen as the condition changes, said polarizing system serving to vary the amount of light which is allowed to pass to said translucent screen from the different colored light sources in inverse ratio as said analyzer screen is rotated.

3. Indicating apparatus for indicating by a change in color comprising, a pair of light sources of contrasting colors, individual light-polarizing means for each source, a light-polarizing analyzer screen upon which polarized light from both sources is projected, the light from the contrasting color sources being polarized at different axes on said screen and means for rotating said screen through the angle between said axes whereby the different colored light rays are transmitted therethrough in inverse ratio as the screen is rotated through said angle and the color of the transmitted light is an indication of the rotary position of said screen.

4. Indicating apparatus for indicating by a change in color comprising, a source of red light and a source of green light, and a light-polarizing analyzer screen, means for projecting light from both sources onto said analyzer screen, means for polarizing the red light which strikes said screen along a given axis, means for polarizing the green light which strikes said screen along an axis at approximately ninety degrees from the first mentioned axis, and a measuring device having a rotary measurement part for rotating said analyzer screen through the angle between said polarizing axes, said measuring device positioning said analyzer screen to allow only green light to pass therethrough when the measurement is zero and to allow only red light to pass therethrough when the measurement is approximately a maximum.

5. Indicating apparatus comprising two light sources of contrasting colors, means for polarizing light from said sources in different axes, a rotary polarized light analyzer, means for projecting polarized light from both sources to said analyzer, and measuring means for rotating said analyzer through an angle corresponding to that between the axes in which the lights from the different sources are polarized to produce an indication of the rotary position of said measuring means by the color of the light transmitted through the analyzer.

6. Indicating apparatus for indicating by means of a change in color of light comprising, two light sources of contrasting colors, a viewing screen onto which light from both sources is transmitted, means interposed between the light sources and the viewing screen for varying the amount of light from the different sources which is allowed to pass to the viewing screen, said means including a movable part covering one portion of said viewing screen and a second movable part covering another portion of said viewing screen, said parts having overlapping portions where both cover a section of the viewing screen, and means responsive to different measurements for moving said movable parts independently for varying the amount of the different colored light transmitted therethrough in inverse ratio, the section of said viewing screen covered by said overlapping portions indicating by its color the sum of the different measurements and by its intensity their ratio, and the remaining portions of said viewing screen indicating by their colors the magnitude of the individual measurements.

7. Indicating apparatus comprising, a pair of light sources of different colors, a translucent viewing plate onto which light is projected from both sources, light-polarizing means interposed between the light sources and viewing screen including means for polarizing the light from the different sources along axes at approximately right angles to each other, a plurality of rotary analyzer screens, the rotary analyzer screens having overlapping portions and portions which do not overlap in the path of the light rays to the viewing screen such that there are different portions of the viewing screen which receive light only through the individual analyzer screens and a section that receives light through all of the analyzer screens, and means responsive to different conditions to be indicated for individually rotating the analyzer screens independently through the angle between the above-mentioned polarizing axes such that the light transmitted through an analyzer screen gradually changes from one of said colors to the other as the corresponding analyzer screen is rotated through such angle.

8. Indicating apparatus for producing indications by a change in color of light comprising, a viewing screen, two sources of light of contrasting colors projected on said screen, means for polarizing the light from one source in one axis, means for polarizing the light from the other source in an axis at right angles to the first mentioned axis, three rotatively mounted analyzer screens through which the polarized light from both sources is transmitted in reaching the viewing screen, said analyzer screens having sections where only two of them overlap, a section where all three overlap, and sections where there is no overlapping in the path of the light rays, a measuring device for rotating each analyzer screen individually through the polarizing angle in response to variations of a condition to be indicated, whereby the corresponding screen transmits only light of one color when at one extremity of its range of movement and only light of the other color at the other extremity of its range of movement, whereby the nonoverlapping portions of the analyzer screens produce color indications corresponding to the magnitude of the different measurements and the overlapping portions transmit light varying in color and intensity in accordance with the rotative positions of the overlapping analyzer screens whereby resultant light indications of the different measurements are obtained.

WILLIAM H. PRATT.